(12) United States Patent
Birchenough et al.

(10) Patent No.: US 6,397,694 B2
(45) Date of Patent: *Jun. 4, 2002

(54) METHOD AND APPARATUS FOR CALIBRATING A FLUID RETARDER

(75) Inventors: Charles W. Birchenough, Morton; Sean E. Carey, Bloomington; Jeffrey A. Champa, Washington, all of IL (US)

(73) Assignee: Caterpillar Inc., Peoria, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/430,325

(22) Filed: Oct. 29, 1999

(51) Int. Cl.⁷ ............................ F16H 59/00; F16H 61/00; F16H 63/00
(52) U.S. Cl. ..................... 74/335; 74/336 R; 477/187
(58) Field of Search ..................... 74/335, 336 R; 477/168, 169, 184, 185, 186

(56) References Cited

U.S. PATENT DOCUMENTS

| 3,585,473 A | * | 6/1971 | Huxtable et al. | 290/14 |
|---|---|---|---|---|
| 3,805,640 A | * | 4/1974 | Schneider et al. | 74/645 |
| 4,321,990 A | | 3/1982 | Koch, Jr. | 192/13 R |
| 4,338,832 A | * | 7/1982 | Pelligrino | 74/866 |
| 4,881,173 A | * | 11/1989 | Kato et al. | 364/431.07 |
| 4,882,906 A | | 11/1989 | Sekiyama et al. | 60/624 |
| 5,107,725 A | * | 4/1992 | Takahashi | 74/867 |
| 5,121,607 A | | 6/1992 | George, Jr. | 60/712 |
| 5,224,577 A | | 7/1993 | Falck et al. | 192/92 |
| 5,482,148 A | | 1/1996 | Dadel et al. | 192/12 A |
| 5,484,353 A | * | 1/1996 | Lux et al. | 477/169 |
| 5,535,863 A | * | 7/1996 | Vukovich et al. | 192/3.3 |
| 5,779,008 A | * | 7/1998 | Vogelsang et al. | 188/296 |
| 5,816,665 A | | 10/1998 | Burnett et al. | 303/3 |
| 5,842,375 A | | 12/1998 | Reeves et al. | 74/335 |

* cited by examiner

Primary Examiner—Sherry Estremsky
Assistant Examiner—Tisha D. Lewis
(74) Attorney, Agent, or Firm—W. Bryan McPherson; Kelsey L. Milman

(57) ABSTRACT

A method and apparatus is configured for calibrating a fluid retarder 155 in a transmission system. The transmission system may include an engine 120 connected to a transmission 135 through a driveshaft 118, or power input shaft. The driveshaft is mechanically connected to the fluid retarder 155. The fluid retarder includes a rotor 162 mechanically connected to the driveshaft 118, and a retarder valve 175 adapted to enable fluid flow across the rotor 162. The method includes the steps of delivering a valve command to the retarder valve, determining a speed of the engine, and calibrating the retarder valve in response to the engine speed, and the valve command.

20 Claims, 3 Drawing Sheets

METHOD AND APPARATUS FOR CALIBRATING A FLUID RETARDER

TECHNICAL FIELD

This invention relates generally to a fluid retarder, and more particularly, to a method and apparatus for calibrating a fluid retarder located on a vehicle.

BACKGROUND ART

Vehicles such as off-highway trucks often use a fluid retarder to assist in slowing the vehicle, without operating the service brakes. A fluid retarder includes a rotor that is mechanically attached to a drive shaft and a retarder valve that enables fluid to flow across the rotor in a manner that slows the speed of the rotor, thereby slowing the speed of the drive train. Movement of the rotor through the fluid converts horse power into heat. That is, the fluid retarder may absorb torque created by the vehicle mass driving the drivetrain, thereby reducing the speed of the vehicle. Accurate control of the fluid retarder, in particular the retarder valve, is necessary in order to provide the desired resistance to assist in slowing the vehicle.

In previous systems the fluid retarder valve was manually calibrated at a service center which was a time consuming process. In addition, manual calibration generally does not provide the desired accuracy with regard to control of the fluid retarder. For example, in some previous systems, the retarder valve was controlled by a switch arrangement that controlled separate electrical solenoids which in turn moved the spool in the retarder valve to positions corresponding to the selected retarding levels. These arrangements did not provide accurate control of the fluid in the retarder cavity and therefore the retarding levels were not consistent. In newer arrangements the retarder valve is controlled by switches which send electrical signals to an electronic controller which in turn sends an electrical signal to a proportional electrical solenoid. The use of a proportional solenoid allows for more accurate control of the retarder, but requires accurate calibration.

In some systems air was used to actuate the retarder valve instead of hydraulic fluid. However, calibration of these systems was also manual, and lacked the desired calibration accuracy.

The present invention is directed to overcoming one or more of the problems identified above.

DISCLOSURE OF THE INVENTION

In one aspect of the present invention, a method for calibrating a fluid retarder in a transmission system is provided. The method includes the steps of delivering a valve command to the retarder valve, determining a speed of the engine, and calibrating the retarder valve in response to the valve command and the speed.

In another aspect of the present invention, an apparatus adapted to calibrate a fluid retarder in a transmission system is disclosed. The transmission system includes an engine connected to a transmission through a driveshaft. The fluid retarder includes a rotor mechanically connected to the driveshaft, and a retarder valve adapted to enable fluid flow across the rotor. The transmission system also includes, a speed sensing device, and a controller adapted to receive a speed signal, generate a valve command signal, determine an engine speed in response to the speed signal, and calibrate the retarder valve in response to the speed signal, and the valve command.

BEST MODE FOR CARRYING OUT THE INVENTION

Figure 1:
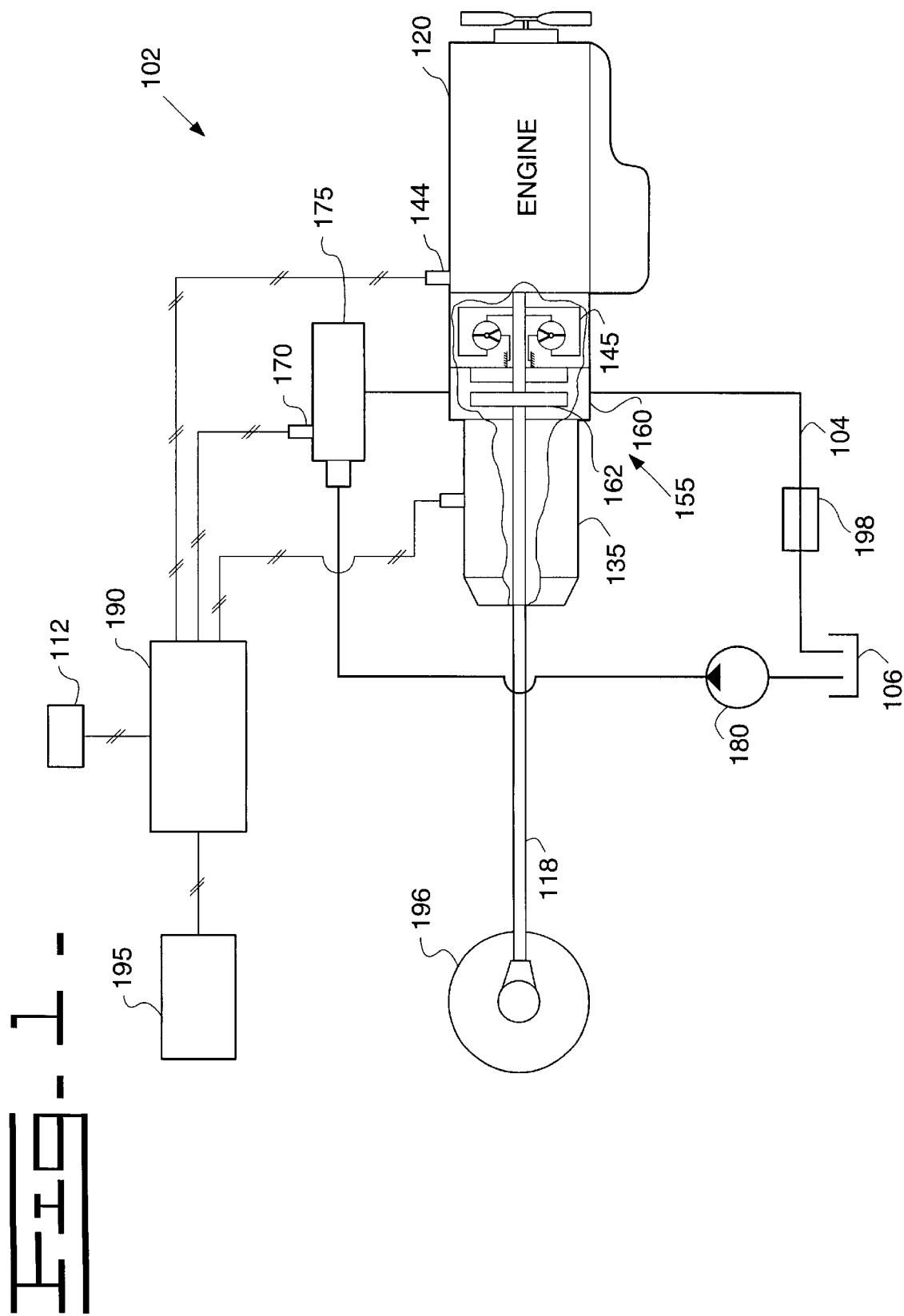
FIG. 1 is a high level diagram of a transmission system.

With reference to FIG. 1, the present invention provides an apparatus and method for calibrating a fluid retarder 155 associated with a vehicle. In the preferred embodiment, the fluid retarder 155 is used to slow the speed of the vehicle.

In one embodiment, as illustrated in FIG. 1, a transmission system 102 is illustrated. A engine 120 is connected to a transmission 135 that drives a rear axle 196, which in turn drives the rear wheels or other propulsion means of the vehicle. A torque converter 145 that is equipped with a lock-up clutch transmits torque between the engine 120 and the transmission 135. In one embodiment, a fluid retarder 155 that includes a fluid housing 160 and an internal rotor 162, is coupled for rotation with the power input shaft, or drivetrain, of the transmission 135. The fluid retarder 155 may include a solenoid 170 that controls the actuation of a proportional control valve 175. The control valve 175 regulates the flow of pressurized fluid from a pump 180 to the fluid housing 160. The pump 180 may be either a variable or fixed displacement pump. The rotor 162 moves through the fluid; thereby absorbing power, or torque, from the drive train and slowing the vehicle. A fluid conduit 104 provides an exit for the fluid contained in the retarder housing 160. The fluid passes from the retarder housing 160 to a cooler 198 and then to a tank 106.

In one embodiment, a retarder level switch 112 may be included, and used by an operator to select a desired resistance of the fluid retarder 155. In the preferred embodiment, the retarder level switch 112 includes a four-position switch. Each of the four positions of switch 112 corresponds to a desired resistance from the fluid retarder 155. For example, the first, second, and third position switch may correspond to a low, medium, and high resistance level, or drive line power absorption, respectively, of the retarder 155. The fourth position may correspond to an off position, indicating no resistance is desired. Alternatively, a continuously variable switch, such as a rheostat (not shown), may be included such that a resistance level proportional to the variable position of the switch is produced.

Although one retarding solenoid 170 is described, it will be recognized to those skilled in the art that the number of solenoids may be readily and easily varied without deviating from the scope of the present invention.

A speed sensor 144, may be included to sense a speed of the engine 120, and responsively generate a speed signal. For example, the speed sensor 112 may be a device sensitive to the passing of gear teeth by a magnetic pickup mounted on the engine 120, as is well known in the art.

An electronic controller 190, receives the speed signal, delivers a valve command to the retarder valve 175, and responsively calibrates the fluid retarder system 155. The controller 190 may also control the transmission of the vehicle. During normal operations, the controller 190 may also receive an input from the retarder switch and responsively control the retarder valve 175. In one embodiment, if a change in engine speed is needed to accommodate the retarder valve 175 calibration method, the controller 190 may deliver a desired speed request to an engine controller 195. The engine controller 195 and the software executing therein, may control the engine speed accordingly. In an alternative embodiment, the function of engine speed control may also be incorporated into the electronic controller 190. Therefore, in the alternative embodiment, one controller 190 may be used.

Figure 2:
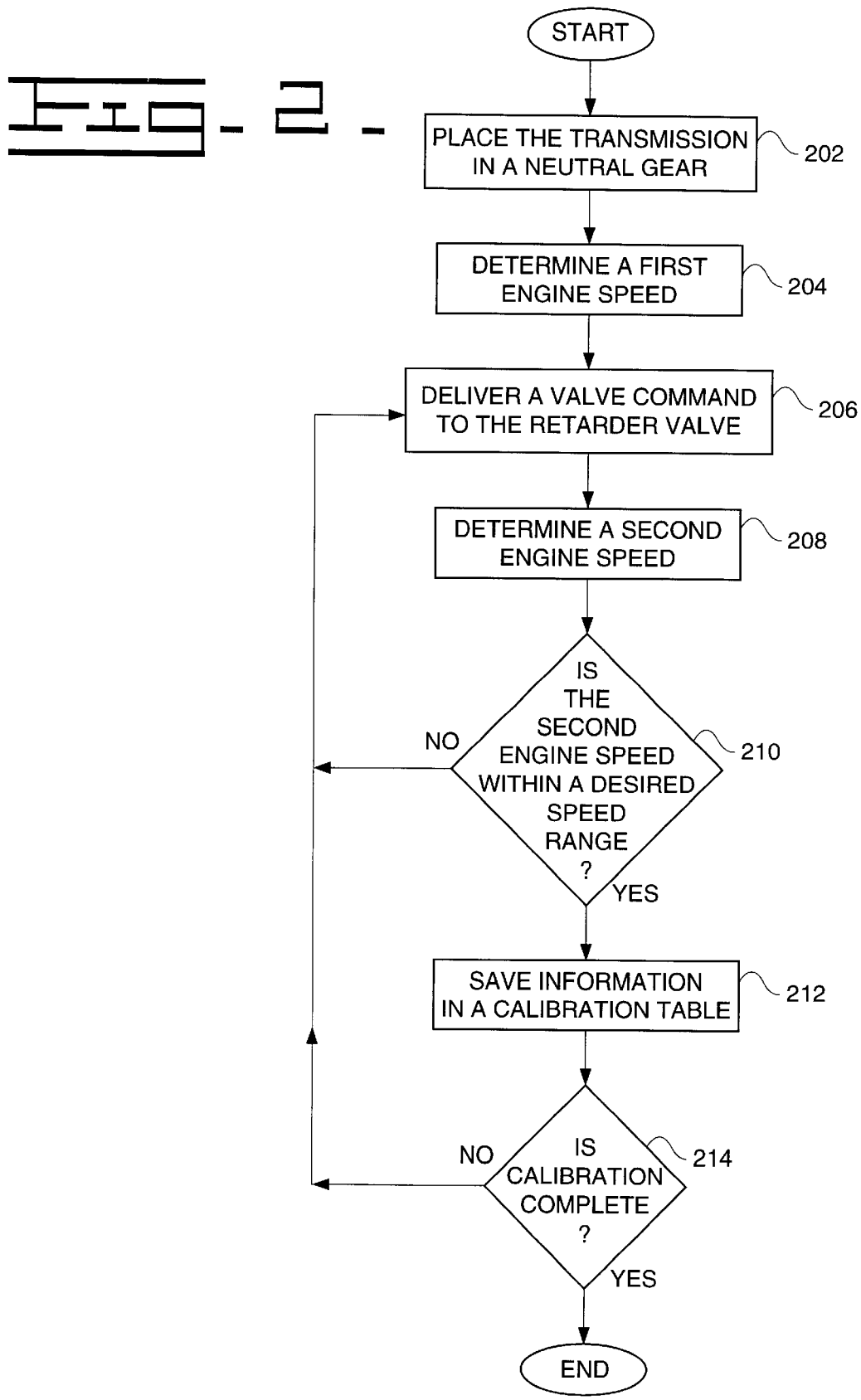
FIG. 2 is a high level flow diagram illustrating a method for calibrating a fluid retarder in a transmission system.

FIG. 2 illustrates the preferred embodiment of a method for calibrating a fluid retarder 155, including the steps of determining a first speed of the engine 120, delivering a valve command to the retarder valve 175, determining a second speed of the engine 120, and calibrating the fluid retarder 155 in response to the first and second speeds, and the valve command.

In a first control block 202 the transmission 135 is placed in a neutral gear during the calibration method. In an alternative embodiment, a gear other than neutral may be selected. In the preferred embodiment, the retarder valve 175 is commanded to a closed position such that no fluid is allowed to pass through the valve 175, to the rotor 162. In a second control block 204, the engine speed is sensed to determine a first engine speed. In the preferred embodiment, the engine is running at a high idle speed, e.g., 2600 revolutions per minute (rpm). If the engine 120 is not running at a high idle speed, the desired engine speed may be adjusted accordingly to enable the engine 120 to run at the high idle speed. Alternatively, the calibration method may be performed at a speed other than high idle. In a third control block 206, a valve command is delivered to the retarder valve 175. The controller 190 delivers an electrical signal to the solenoid 170, in order to control the position of the valve 175. In the preferred embodiment, the valve command is based on a desired resistance level. For example, the desired resistance level may correspond to the settings of the retarder switch 112 for a low, medium, and high desired resistance. That is, the retarder valve 175 may be calibrated to determine an appropriate valve command, to provide a low, medium and high resistance level respectively.

In a fourth control block 208 the speed of the engine 120 is sensed to determine a second engine speed. In one embodiment, there may be a delay between the time the valve command is delivered to the valve, and the time the second engine speed is sensed. The delay enables the engine speed to stabilize in response to the new valve command. In a first decision block 210 the second engine speed is compared to a desired speed, or a desired speed range. If the second engine speed is not within the desired speed range, then control returns to the third control block 206, a new valve command is determined and delivered to the valve, and the process is repeated. In one embodiment, the new valve command is determined in response to the prior valve command and the resultant second engine speed. For example, if the second engine speed was higher than the desired speed range, then the valve command is increased, opening the valve 175 further. If the second engine speed was lower than the desired speed range, then the valve command is decreased, reducing the valve opening.

If the second engine speed is within the desired speed range, for example, then, in a sixth control block 212 the valve command, and corresponding desired resistance level, is saved in a calibration look up table. Control then passes to a second decision block 214.

In a second decision block 214 a determination is made regarding whether the calibration is complete. For example, have appropriate valve commands been calibrated for the desired resistance levels, e.g., low, medium, and high. If the calibration is not complete, then control returns to the third control block and a new valve command is determined corresponding to another desired resistance level, and the process is repeated.

The desired speed range for a particular resistance level is implementation dependent. For example, empirical analysis may be performed to determine the desired speed change that should result from the high, medium, and low resistance levels.

In an alternative embodiment, multiple valve commands are delivered to the retarder valve 175, and the corresponding speed changes are determined and stored in a look up table. For example, the valve commands may be incrementally increased to provide more fluid flow across the rotor 162, until predetermined desired engine speed ranges are reached. The predetermined desired engine speed ranges and the corresponding valve commands may be saved in the calibration look up table. Therefore, the desired resistance level may be associated with a corresponding valve command.

In another alternative embodiment, the valve 175 may be calibrated for a continuous range of motion, e.g., from 0–100% open. Therefore, a continuously variable input switch, such as a rheostat, may be used to dial in a desired resistance level. The valve 175 may calibrated so that for a given desired resistance level input, an appropriate valve command is provided to provide the desired resistance. Therefore, the valve commands may be incrementally increased to provide more fluid flow across the rotor 162. The resulting speed may be sensed The valve command and resulting speed, or speed changes, and correlated desired resistance level may be stored in the calibration table.

In another alternative embodiment, the initial, or first engine speed may be varied during the calibration process. That is, the calibration process may be performed for a variety of initial engine speeds, such as low, medium, and high idle. Or the calibration process may be performed for a full range of initial engine speeds. Therefore the calibration table may contain information for the first engine speed, desired resistance level, and corresponding valve command.

Figure 3:
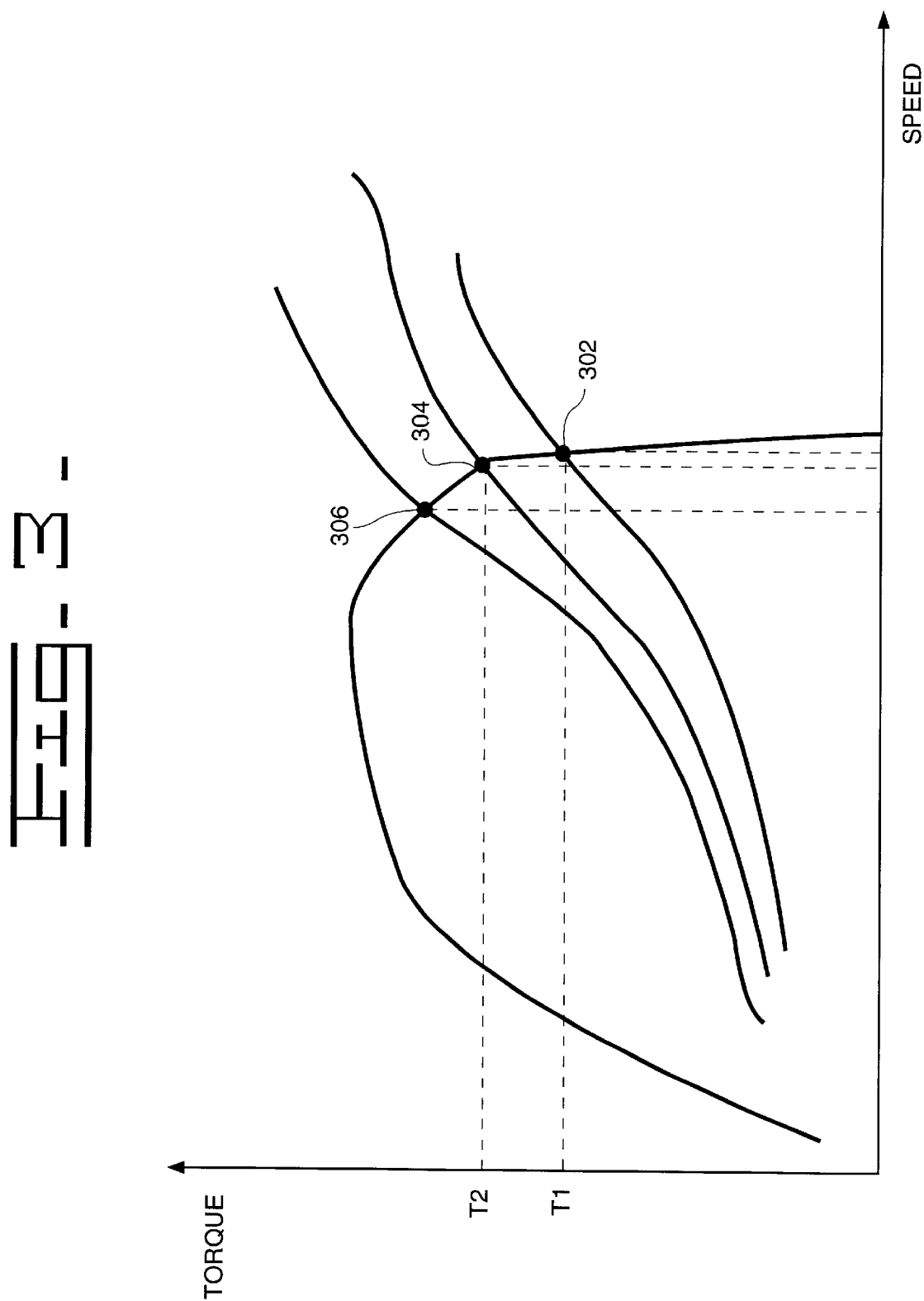
FIG. 3 illustrates one embodiment of a torque absorption curve.

In an alternative embodiment, the valve calibration may be performed in terms of desired torque absorption. One embodiment of a torque absorption curve is illustrated in FIG. 3. As the valve command is increased, the engine speed is slowed, from a first speed 302 to a second speed 304, to a third speed 306, resulting in some of the engine torque being absorbed by the fluid retarder 155. The first speed 302, second speed 304 and third speed 306, may represent desired speeds, or speed ranges corresponding to a desired resistance level, e.g., low and medium and high resistance levels. In addition, the torque associated with the first 302, second 304, and third speeds 306 may be saved as the desired torque absorption corresponding to the desired resistance level. For example, the first torque (T1) associated with the first engine speed 302 is subtracted from a second torque (T2) associated with the second speed 304, resulting in a toque absorption of T2−T1.

In an alternative embodiment, the pump displacement, and therefore fluid flow from the pump may be varied and accounted for in the calibration process. Therefore the calibration look-up table may contain a retarder valve command as a function of desired resistance level, current engine speed, and current pump displacement.

In one embodiment, during normal operation of the vehicle, the operator may select a desired retarder resistance to be applied. The current engine speed may be sensed. The look-up table is then accessed to determine the corresponding valve command based on the desired resistance, and the current engine speed. The valve command is then delivered to the retarder valve 175. In an alternative embodiment, a retarder control program may be utilized to monitor various engine and vehicle parameters, and responsively determine when and how much resistance should be applied, and then access the look-up tables to determine the appropriate valve command. For example, an autonomous vehicle control program may determine when to apply resistance from the fluid retarder 155, and how much resistance should be applied, in response to engine and vehicle parameters.

In one embodiment, the calibration may be initiated by service tool connected to the vehicle, where the service tool is in communication with the controller 190. Alternatively the controller 190 may initiate the calibration procedure upon operator command, via a keypad or display for example.

In one embodiment, multiple vehicle parameters are sensed prior to, or during the initiation of the calibration method. For example, the gear selector (not shown) may be sensed to determine the current gear of the vehicle. If the vehicle is not in the proper, or desired gear, for the calibration method, then the calibration will not proceed. In addition, other parameters, including, the parking brake pressure, hoist, service brakes, and fluid temperature may be sensed to ensure the machine is in an adequate state for the calibration procedure to be performed.

The present invention may be embodied in a controller 190 which utilizes arithmetic units to control process according to software programs. Typically, the programs are stored in read-only memory, random-access memory or the like. The method illustrated in FIG. 2 and disclosed in the present invention may be readily coded using any conventional computer language.

Industrial Applicability

The present invention provides a method and apparatus for calibrating a fluid retarder 155 in a transmission system. The transmission system includes an engine 120 connected to a transmission 135 through a driveshaft 118, or power input shaft. The driveshaft is mechanically connected to the fluid retarder 155. The fluid retarder includes a rotor 162 mechanically connected to the driveshaft 118, and a retarder valve 175 adapted to enable fluid flow across the rotor 162. The method includes the steps of determining a first speed of the engine, delivering a valve command to the retarder valve, determining a second speed of the engine, and calibrating the retarder valve in response to the first and second speed, and the valve command.

In one embodiment, the fluid retarder 155 is calibrated by placing the transmission 135 in neutral, and then running the engine 120 at a high idle speed. The controller 190 then delivers a series of valve commands to the retarder valve 175, incrementally opening the valve 175 from a closed position, until one or more predetermined desired engine speeds, or speed ranges, is achieved. In the preferred embodiment, the desired engine speed ranges correspond to desired resistance levels, for example, a high, medium, or low resistance. The valve commands and corresponding resistance levels, or engine speed ranges are stored in a look-up table.

During normal operation of the machine, a desired resistance level is received, either from an operator or a control program, and the look up table is accessed to determine the corresponding valve command. The controller 190 then delivers the valve command to the retarder valve 175.

Other aspects, objects and advantages of the present invention can be obtained from a study of the drawings, the disclosure and the appended claims.

What is claimed is:

1. A method for calibrating a fluid retarder in a transmission system, the transmission system including an engine connected to a transmission through a drive shaft, the fluid retarder including a rotor mechanically connected to the drive shaft, and a control valve enabling fluid flow across the rotor, comprising the steps of:

determining a first engine speed;

delivering a valve command to said retarder valve;

determining a second engine speed; and associating valve command with said second engine speed.

2. The method, as set forth in claim 1, further comprising a first step of placing the transmission in a neutral gear.

3. The method, as set forth in claim 1, further comprising;

determining a desired speed range;

after said second determining step, comparing said second engine speed to said desired speed range, wherein said associating step includes associating said valve command with said second engine speed if said second engine speed is within said desired speed range.

4. The method, as set forth in claim 1, wherein said first speed is one of a high idle speed, a medium idle speed, and a low idle speed, and wherein said desired resistance is one of a low, medium, or high resistance.

5. The method, as set forth in claim 3, wherein said desired speed range is correlated to a desired resistance.

6. The method, as set forth in claim 3, further including after said associating step, the step of storing said valve command and said desired resistance in a look-up table.

7. The method, as set forth in claim 6, wherein said storing step includes storing at least one of said first engine speed and said second engine speed in said look-up table.

8. The method, as set forth in claim 6, further including the steps of:

determining a preferred torque absorption;

correlating said torque absorption to at least one of said speed ranges and said desired resistance; and determining a preferred valve command in response to said torque absorption and said look-up table.

9. The method, as set forth in claim 6, further including the steps of:

receiving an input indicative of said preferred resistance; and determining said valve command in response to said preferred resistance and said look-up table.

10. The method, as set forth in claim 6, further including the steps of:

after said storing step, determining a desired fluid flow rate across the rotor, said flow rate correlated to said second engine speed, wherein said associating step includes associating said desired fluid flow rate with said valve command and said second engine speed; and determining a preferred valve command in response to said fluid flow rate and said look-up table.

11. The method, as set forth in claim 4, further including the steps of:

determining a preferred resistance; and determining a preferred valve command in response to said preferred resistance and said look-up table.

12. An apparatus for calibrating a fluid retarder in a transmission system, the transmission system including an engine connected to a transmission through a drive shaft, the fluid retarder including a rotor mechanically connected to the drive shaft, and a control valve enabling fluid flow across the rotor, comprising:

a speed sensing device for sensing the speed of the engine and responsively generating a plurality of speed signals; and a controller for receiving a first speed signal, determining a first engine speed for said first speed signal, generating a valve command signal, determining a second engine speed from a second speed signal, and associating said valve command with said second engine speed.

13. The apparatus, as set forth in claim 12, wherein said transmission is placed in a neutral gear.

14. The apparatus, as set forth in claim 12, wherein said first speed is one of a high idle speed, a medium speed, and a low idle speed, and wherein said desired resistance is one of a low, medium, and high resistance.

15. The apparatus, as set forth in claim 12, further comprising:

an input device for receiving a preferred resistance, and wherein said controller determines a preferred valve command in response to said preferred resistance and said look-up table.

16. The apparatus, as set forth in claim 13, wherein said controller determines a desired speed range.

17. The apparatus, as set forth in claim 16, wherein said controller compares said second engine speed to said desired speed range and associates said valve command with said second engine speed if said second engine speed is within said desired speed range.

18. The apparatus, as set forth in claim 16, wherein said controller stores said valve command and said desired resistance in a look-up table.

19. The apparatus, as set forth in claim 17, wherein said controller correlates said desired speed range to a desired resistance.

20. The apparatus, as set forth in claim 18 wherein said controller stores at least one of said first engine speed and said second engine speed in said look-up table.

\* \* \* \* \*

UNITED STATES PATENT AND TRADEMARK OFFICE
CERTIFICATE OF CORRECTION

PATENT NO.    : 6,397,694 B2                                           Page 1 of 1
DATED         : June 4, 2002
INVENTOR(S)   : Charles W. Birchenough et al.

It is certified that error appears in the above-identified patent and that said Letters Patent is hereby corrected as shown below:

Column 6,
Line 14, insert -- said -- before the word "valve".

Signed and Sealed this

Twenty-sixth Day of November, 2002

Attest:

Attesting Officer

JAMES E. ROGAN
Director of the United States Patent and Trademark Office